Dec. 20, 1966  R. W. WOODRING ETAL  3,292,353

FLAIL MOWER STRUCTURE

Filed Sept. 28, 1964

Inventors:
Robert W. Woodring
Bruno J. Panek
By: John J. Kowalik Atty.

United States Patent Office 3,292,353
Patented Dec. 20, 1966

3,292,353
FLAIL MOWER STRUCTURE
Robert W. Woodring, La Grange, and Bruno J. Panek, Chicago, Ill., assignors to International Harvester Company, Chicago, Ill., a corporation of New Jersey
Filed Sept. 28, 1964, Ser. No. 399,586
12 Claims. (Cl. 56—294)

This invention relates to cutting apparatus and more specifically to the mounting for knives of a rotor or chopper.

The general object of the invention is to provide a novel, efficient and rugged mounting for flails in a rotary cutter.

A more specific object of the invention is to provide a novel mounting for flails of the rotary chopper, said mounting incorporating means which are readily assembled and removed with respect to a supporting shaft structure.

Heretofore, it has been a practice in most instances to provide a hollow shaft or a solid shaft to which there are permanently attached, as by welding, a plurality of ears which pivotally mount the flails. The welding of such lugs or ears frequently warps the shaft and furthermore in view of the amounts of weld that are required in the securement of the different lugs, the shaft often is unbalanced.

A principal object of the invention is to provide a novel mounting means which are easily applied and removed with respect to the supporting shaft and wherein the mounting means are self-locking with respect to the center shaft so that the mounting means are tightly secured to the shaft and prevented from displacing by rotation about an axis normal to the shaft axis.

A further object of the invention is to provide a novel mounting for rotary flails wherein the mounting is adjustable about an axis normal or radial with respect to the axis of the support shaft so that the knife structures which are carried on the mounting means may be positioned in various positions about the radial axes to obtain various cutting patterns and discharges of the material.

These and other objects and advantages inherent and encompassed by the invention will become more readily apparent from the specification and the drawings wherein.

Figure 1:
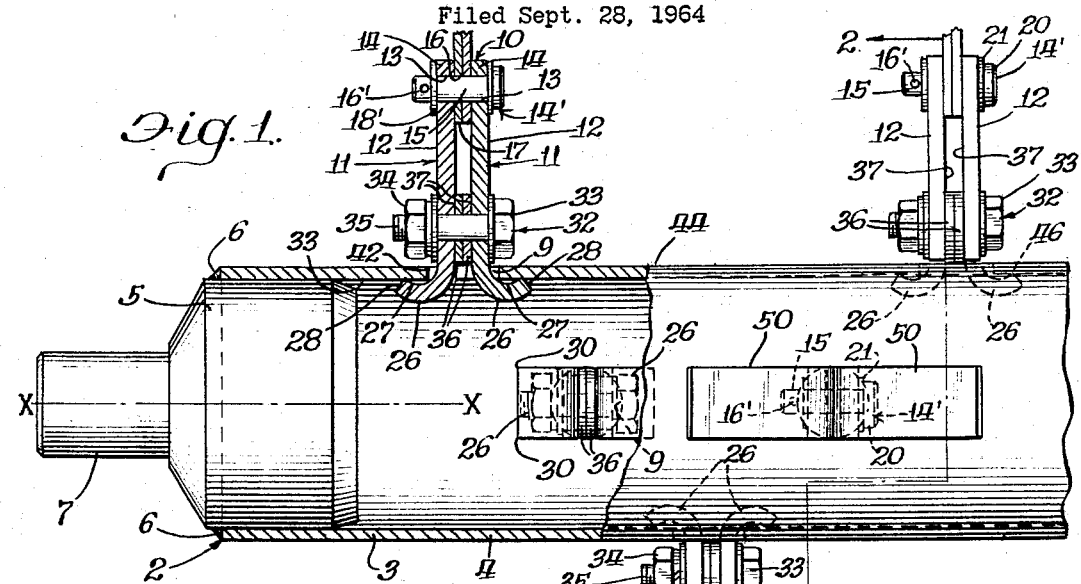
FIGURE 1 is a side elevational view partly in radial section of the improved rotor.
Figure 2:
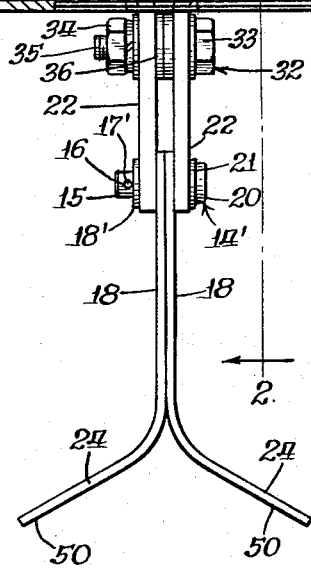
FIGURE 2 is a sectional view taken in the planes substantially indicated by the line 2—2 of FIGURE 1.
Figure 2:
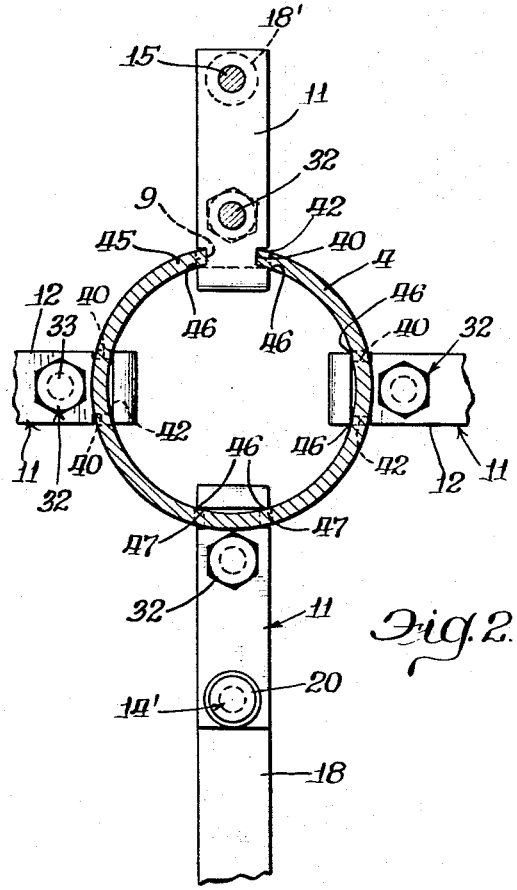
Figure 3:
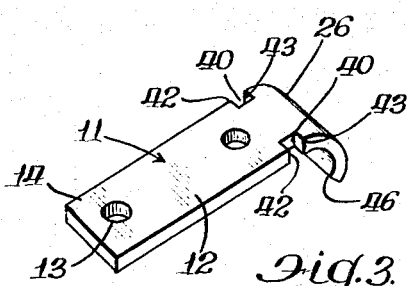
FIGURE 3 is a perspective of one of the holders or mounting elements.

In the drawings there is shown a rotor generally designated 2 which comprises a shaft 3 which in the present instance includes a cylindrical sleeve or tube member 4 to each end of which may be attached end plugs or extensions 5 in any convenient manner as by welding at 6. The extensions 5 have a reduced trunion end section 7 at each end about which the shaft rotates in associated bearings (not shown). Thus the shaft has a center axis $x$—$x$ indicated in FIGURE 1 about which the entire rotor assembly rotates. Normally this axis $x$—$x$ is horizontally disposed although of necessity it need not be so. The sleeve portion 4 is provided with a geometric pattern of round openings 9 which extend through the sleeve 4, these openings 9 being located in such a pattern as will obtain a balance of the rotor upon mounting of the associated knives and as hereinafter described and also to provide a pattern for the knives to cut all the material as the rotor is passed over the material such as growing forage. Each opening 9 admits a holding assembly or knife mounting means 10 therethrough and the mounting means comprises a pair of oppositely disposed J-shaped straps or holder elements 11, 11 each holder element 11 having a flat elongated strap like shank portion 12 provided with a transverse aperture 13 adjacent to its distal or outer end 14. The apertures 13 of the opopsed straps 11 are aligned and admit a securing pivot pin 14' therethrough which has a shank portion 15 extending through openings 16, 16 in the inner ends 17 of opposed or reversely arranged L-shaped knife blades 18, 18. It will be seen that the pin 14' has a head 20 which engages through a washer 21 against the outer side 22 of the adjacent holder strap 12 and that the opposite end of the shank portion 15 is provided with an opening 16' which receives a cotter key 17', said key 17' abutting through a washer 18' against the external side 22 of the adjacent holder shank portion 12. The knives 18, 18 are thus swingable about an axis of the shank portion 15 of pin 14. Normally the shank portion 15 is arranged generally parallel to the axis $x$—$x$ of the mounting of a rotor shaft. The outer end portions 24 of the respective knives 18 diverge axially with respect to the rotor shaft.

As best seen in FIGURE 1, the straps 11, 11 are J-shaped in edge view and the inner end portions 26 of the respective straps provide hook ends which bow inwardly, that is toward the axis of the shaft, and their concavities indicated at 27 are directed outwardly. The inner ends or edges 28 of the end portions 26 are squared off and provide with the lateral edge 28 of the holders surfaces sharp points 30 which upon the shank portions 11 being drawn together by means of the securing means in the form of a nut and bolt connection 32 are caused to dig into the interior surface 33 of the tube 4 by fulcruming on the exterior side of the tube as hereinafter described. The end portions 26 are placed under a bending moment attendant to clamping of the two holding members together by a bolt 32 which comprises a head 33 abuttable with the external side 22 of the respective strap portion 11 and the abutment of a nut 34 which is threaded on a shank portion 35 of the bolt 32 against the external sides 22 of the respective strap 11. In order to control the amount of load on the end portions 26, a selected number of spacers or shims 36 are provided on the shank 35 and the spacers abut the interior sides 37 of the respective strap members 11. In order to hold the holding means against endwise movement that is radially with respect to the sleeve or tube 4 the straps 11 adjacent to their inner ends are provided with outwardly open notches 40, 40 which are dimensioned to snugly admit the adjacent portions 42 of the sleeve or tube 4. Inasmuch as the mounting openings 9 are round and the strap portions 11 are spaced and spread from the diameter of the opening the straps extend chordally with respect to the periphery of the opening of the respective opening 9 and admit the tube peripheral portions 42 into the notches 40 between the upper and lower surfaces 42, 43 of each notch. Notches 40 are slightly larger than the thickness of wall portion 45 of the tube and the surfaces 42, 43 respectively oppose the external side 44 and internal side 33 of the tube. The ledges or fulcrums or fulcrum shoulders 42 react against the arcuate surface 44 and with the springing action of the steel of the strap as a bending moment is imposed on the end portions 26 by the bolt 32 being drawn up the points 46 of the holder portion dig into the internal side of the tube as at 47, 47. Thus the holders are prevented from rotating about their longitudinal axis and are held against movement radially of the tube.

It will be noted that the holding means 10 can be adjusted about a radial axis with respect to the axis $x$—$x$ such that the position of the blades 18, 18 and their cutting attitude may be varied. In other words, all the knife blades may have their blades or cutting edge portions indicated at 50, 50 parallel to the axis $x$—$x$ or at various angles transverse to the axis $x$—$x$. The blades and the mounting means therefore could be so arranged that the blades on one side would be angled toward one side and the other end of the rotor could be angled toward the other end or they may be angled in various different positions depending on the pattern or cutting effect required and the scattering or withdrawing of material desired.

What is claimed is:

1. In a cutter, a rotor shaft having a wall portion with a radial opening, said wall portion presenting inner and outer abutment surfaces, and knife holder means projecting through the opening and having inner end portions extending beyond the periphery of the opening and in engagement with inner surface of said wall portion, said holder means having portions overlapping said outer abutment surface, and means securing said holder means through respective portions thereof against said outer surface of said wall portion and reactively against said inner surface.

2. A rotor shaft including a tubular member having a wall section with radial openings therethrough, said wall section presenting internal and external sides, means comprising a pair of holder elements disposed in side by side relation and extending through the related opening and having inner end portions within said tubular member, said inner end portions extending away from each other and abutting said internal side of said wall section of the tubular member, means providing fulcrum reactions for said elements against the external side of the wall section of the tubular member, and means fulcruming said elements into the abutted position of said inner end portions and securing the same in such position.

3. The invention according to claim 2 and said inner end portions having at least one sharp point penetrating said internal side of the wall portion.

4. The invention according to claim 2 and said means providing fulcrum reactions comprising shoulders and said elements engaging the external side of said wall section.

5. The invention according to claim 2 and said means fulcruming said elements into engaged position comprising means securing said elements to each other and drawing the same toward each other.

6. In a knife mounting from a hollow rotor shaft of cylindrical wall section having a radial round opening therethrough, said mounting comprising a pair of J-shaped holder elements each having a hook inner end portion and a straight shank portion, said shank portion having lateral edges, said elements having a width less than the diameter of the opening and insertable into the opening at the diameter thereof, said elements oriented back to back with the inner end portions directed oppositely, the shank portion of each element having notches in the lateral edges, said elements having a spread apart position wherein said notches receive portions of the wall section about the opening, spacer means between said shank portions holding the same in spread apart position, and means securing said elements to each other in said spread apart relation, and means for mounting knives from said shank portions.

7. The invention according to claim 6 and said means for mounting the knives comprising a pivot element extending through the pair of elements and knives mounted on the pivot element between said pair of elements.

8. The invention according to claim 6 and said notches providing fulcrum shoulders at opposite sides thereof for rocking action against the cylindrical wall section and said inner end portions having free edges providing points having penetrating engagement with the interior of said wall section.

9. In a mounting for knife blades, a hollow center shaft having a cylindrical wall section presenting inner and outer cylindrical surfaces and having a round radial opening therethrough, a pair of mouting elements of a width slightly less than the diameter of the opening and having inner end portions within the shaft curved outwardly and terminating in inner edges extending chordally with respect to said inner surface and having opposite sharp ends in engagement with the surface, said element having lateral edges with slots therein receiving portions of said wall section about the opening, said slots providing edges engaging the outer side of the wall section tangentially and fulcruming said elements to engaged position of said sharp ends, means between said elements holding the same in position with the wall section in the slots, and knife means mounted on said elements.

10. The invention according to claim 9, and said mounting positionable in angularly displaced positions about an axis extending radially with respect to the shaft axis.

11. In a knife holder device a mounting element comprising a structure having a flat shank portion having one end adapted to support a flail knife and another end portion adapted to be supported from a rotating wall section and extending transversely from said shank portion, said shank portion having adjacent to said last mentioned end portion a pair of aligned notches in the lateral edges thereof adapted to receive said wall section.

12. The invention according to claim 11 and said last mentioned end portion having a free edge extending transversely of said lateral edges and developing securing points therewith.

References Cited by the Examiner

UNITED STATES PATENTS

| | | | |
|---|---|---|---|
| 939,777 | 11/1909 | Williams | 241—192 |
| 2,571,042 | 10/1951 | Kemp | 17—11.1 |
| 2,901,015 | 8/1959 | Swenson et al. | 146—106 X |
| 2,974,888 | 3/1961 | Everett | 241—191 |
| 3,098,614 | 7/1963 | Meyer | 241—193 |
| 3,124,832 | 3/1964 | Kravetz et al. | 17—11.1 |

ABRAHAM G. STONE, *Primary Examiner.*

RUSSELL R. KINSEY, *Examiner.*

M. C. PAYDEN, *Assistant Examiner.*